United States Patent [19]
Shimazaki

[11] Patent Number: 5,947,234
[45] Date of Patent: Sep. 7, 1999

[54] DISC BRAKE

[75] Inventor: Toru Shimazaki, Hazu-gun, Japan

[73] Assignee: Aisin Seiki Kabushiki Kaisha, Kariya city, Aichi pref., Japan

[21] Appl. No.: 08/833,625

[22] Filed: Apr. 8, 1997

[51] Int. Cl.[6] .............................. F16D 65/38; F16D 65/40
[52] U.S. Cl. .................................... 188/73.36; 188/73.38
[58] Field of Search ............................. 188/73.36, 73.37, 188/73.38, 73.44, 73.45, 72.3, 72.4, 250 E, 264 G

[56] References Cited

U.S. PATENT DOCUMENTS

| | | | |
|---|---|---|---|
| 4,044,864 | 8/1977 | Karasudani | 188/73.36 |
| 4,417,647 | 11/1983 | Cotter et al. | 188/73.38 |
| 4,441,588 | 4/1984 | Saito | 188/73.38 |
| 5,064,028 | 11/1991 | Antony et al. | 188/73.38 |
| 5,099,962 | 3/1992 | Furusu et al. | 188/73.37 |
| 5,511,638 | 4/1996 | Tsuruta | 188/73.38 |
| 5,518,088 | 5/1996 | Brosilow | 188/73.37 |

FOREIGN PATENT DOCUMENTS

| | | |
|---|---|---|
| 1 575 952 | 2/1970 | Germany . |
| 1 954 332 | 5/1971 | Germany . |
| 2 225 178 | 1/1974 | Germany . |
| 38 39 957 | 5/1990 | Germany . |
| 40 10 461 | 10/1991 | Germany . |
| 51-659 | 1/1976 | Japan . |
| 1 267 199 | 3/1972 | United Kingdom . |

Primary Examiner—Peter M. Poon
Attorney, Agent, or Firm—Burns, Doane, Swecker & Mathis, LLP

[57] ABSTRACT

To reduce brake noise sufficiently, a vehicle disc brake of the present invention includes a pair of pads for supporting a disc rotor therebetween, with each pad being provided with a backing plate. A mounting member which is adapted to be secured to the vehicle is designed to receive brake torque applied to the pads. Two end surfaces of the backing plate, which are opposed substantially in the turning direction of the disc rotor, are provided with a pair of projections. The projections elastically abut on first brake torque receiving surfaces of the mounting member. The backing plate has also an end surface that is supported by second brake torque receiving surfaces of the mounting member. The first and second brake torque receiving surfaces are located towards the radially outward and inward sides of the disc rotor respectively, with respect to a center of gravity of the backing plate. Furthermore, one working portion of a spring member elastically abuts on the top of one of two semicircular portions of the backing plate from the radially outward side, while another inclined working portion of the spring member elastically abuts on the other semicircular portion also from the radially outward side. When the pads are displaced in the axial direction of the disc rotor, frictional contact is established between the backing plate on one hand and the first and second brake torque receiving surfaces of the mounting member and the working portions of the spring member on the other hand, thus damping the displacement of the pads.

18 Claims, 6 Drawing Sheets

DISC BRAKE

FIELD OF THE INVENTION

The present invention generally relates to brake assemblies for applying a braking force to a wheel of a vehicle. More specifically, the present invention concerns a vehicle disc brake for substantially eliminating brake noise that is caused by oscillatory displacement of pads during the braking operation.

BACKGROUND OF THE INVENTION

According to a generally known disc brake construction, in order to reduce brake noise that is caused by oscillatory displacement of the pads during the braking operation, a shim is interposed between each pad and another member, such as a hydraulic piston, for pressing the pad. The shim is capable of damping vibrations and may be coated with rubber or provided with a grease accommodating portion.

Furthermore, it is generally known that while the brake i& in operation, a brake torque receiving surface of a mounting member abuts only one of the two end surfaces of the pad backing plate that are opposed substantially in the turning direction of the disc rotor.

However, such a disc brake construction is unable to prevent the oscillatory displacement of the pads during the braking operation, especially because the brake torque receiving surface of the mounting member abuts only one of the end surfaces of the backing plate. Although the shim employed in this construction is capable of damping vibrations, brake noise cannot be reduced to a permissible level.

SUMMARY OF THE INVENTION

A need thus exists for a disc brake that achieves significant reduction in brake noise during the operation thereof.

According to one aspect of the present invention, a disc brake assembly includes a disc rotor, a pair of pads each arranged in face to face relation with a respective side surface of the disc rotor and provided with a backing plate, and a mounting member for receiving brake torque applied to the pads. The mounting member is adapted to be secured to a non-rotating portion of the vehicle and is provided with a pair of first brake torque receiving surfaces and a pair of second brake torque receiving surfaces. Each backing plate has two end surfaces opposed substantially in the turning direction of the disc rotor, and the end surfaces are adapted to elastically abut the first brake torque receiving surfaces. Each backing plate also has two end portions spaced apart in the turning direction of the disc rotor. These end portions each are adapted to elastically abut on one of the second brake torque receiving surfaces. Furthermore, the first brake torque receiving surfaces are located towards the radially outward side of the disc rotor with respect to the center of gravity of the pads, whereas the second brake torque receiving surfaces are located towards the radially inward side of the disc rotor with respect to the center of gravity of the pads.

Each backing plate may have a first pair of projections each respectively formed on one of the end surfaces opposed substantially in the turning direction of the disc rotor, with such first pair of projections abutting the first brake torque receiving surfaces. Each backing plate may also have a second pair of projections each formed on respective ones of the end surfaces opposed substantially in the turning direction of the disc rotor, with the second pair of projections having said end portions that abut on the second brake torque receiving surfaces.

The disc brake may further include a spring member having working portions elastically abutting on two end portions of the radially outward end surfaces of the backing plates, the two end portions being spaced apart in the turning direction of the disc rotor. In this case, the spring member urges the backing plates to be pressed against the second brake torque receiving surfaces of the mounting member. The spring member urges one of the end surfaces of each backing plate that are opposed substantially in the turning direction of the disc rotor to elastically abut on one of the first brake torque receiving surfaces of the mounting member.

According to another aspect of the present invention, a disc brake for being mounted with respect to a disc rotor that rotates with a vehicle wheel includes a pair of pads positioned in opposing rotation to one another for being disposed in face to face relation with a side surface of the disc rotor, with each pad being provided with a backing plate. The backing plates are mounted on a mounting member which is adapted to receive brake torque applied to the pads. The mounting member has at least one first brake torque receiving surface and at least one second brake torque receiving surface. The first and second brake torque receiving surfaces lie in respective planes that intersect one another. Each backing plate includes at least one first end surface which abuts the first brake torque receiving surface during application of torque to the pads and at least one second end surface which abuts the second brake torque receiving surface during application of torque to the pads.

BRIEF DESCRIPTION OF THE DRAWING FIGURES

Further details and features of the present invention will become apparent from the following detailed description considered with reference to the accompanying drawing figures in which like elements are designated by like reference numerals and wherein.

DETAILED DESCRIPTION OF PREFERRED EMBODIMENTS

Referring to FIGS. 1 through 7, a first embodiment of the disc brake of the present invention will be described. As shown in FIGS. 1 through 4, the disc brake 10 is of the type having two opposed cylinders that are securely fixed. The disc brake 10, which is to apply a braking force to a disc rotor 11, includes a pair of pads 12, 12, a mounting member 13, a pair of brake fluid chambers 14, 14 and a pair of pistons 15, 15. The disc rotor 11 rotates integrally with a wheel and each pad 12 is arranged in face to face relation with a respective side surface of the disc rotor 11. The mounting member 13 is fixed to a non-rotating portion of the vehicle by bolts. This mounting member 13 is adapted to guide the pads 12, 12 as they move axially along the axial direction of the disc rotor 11 and receive the brake torque applied to the pads 12, 12.

Figure 4:
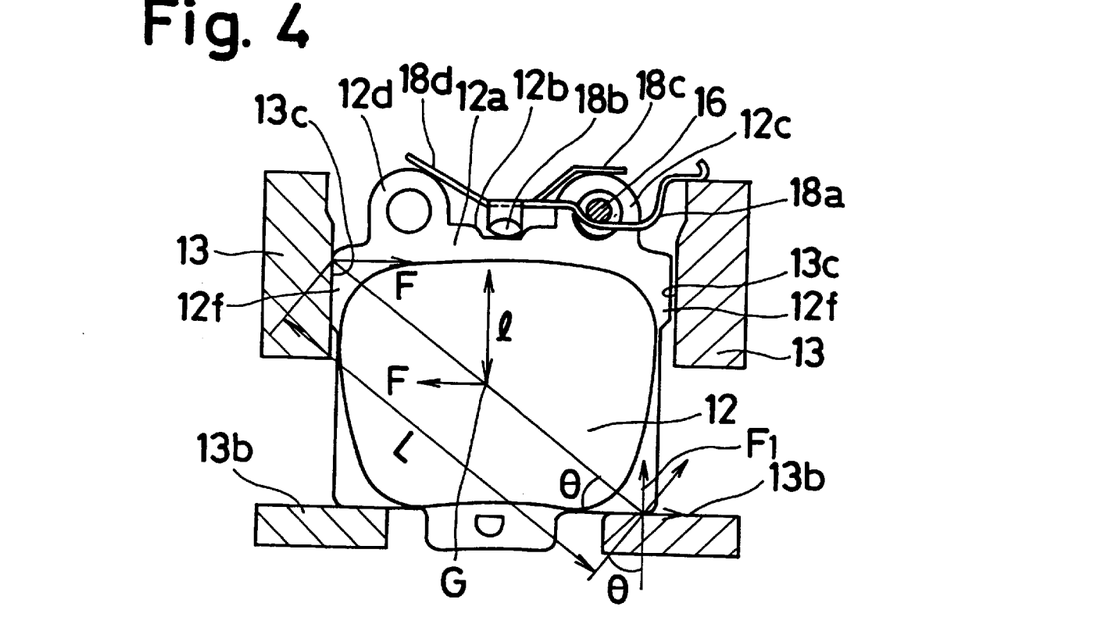
FIG. 4 is a side view, partly in section, of a portion of the disc brake showing the relationship among the pad, the pad supporting pin and the spring member.

The mounting member 13 includes first brake torque receiving surfaces 13c, 13c that face oppositely located lateral end surfaces of the backing plates 12a, 12a (i.e., the end surfaces of the backing plates 12a, 12a that are opposed in the turning direction) and second brake torque receiving surfaces 13b, 13b that are formed on one of the end surfaces that are opposed in the radial direction with respect to the disc rotor. The second brake torque receiving surfaces 13b, 13b are oriented generally perpendicularly with respect to the first brake torque receiving surfaces 13c, 13c. Thus, the first brake torque receiving surfaces 13c, 13c lie in respective planes that intersect the plane in which lies the second brake torque receiving surfaces 13b, 13b.

Figure 1:
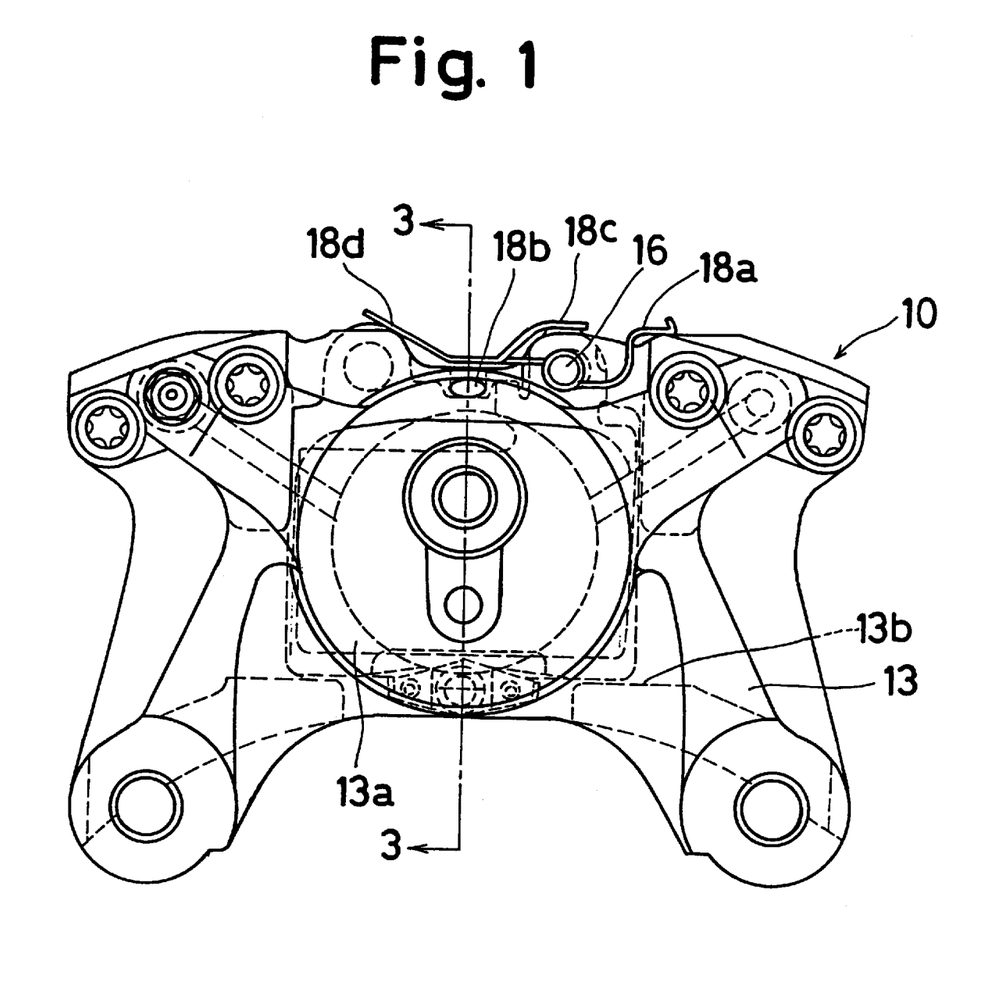
FIG. 1 is a front elevational view of a disc brake according to a first embodiment of the present invention.
Figure 2:
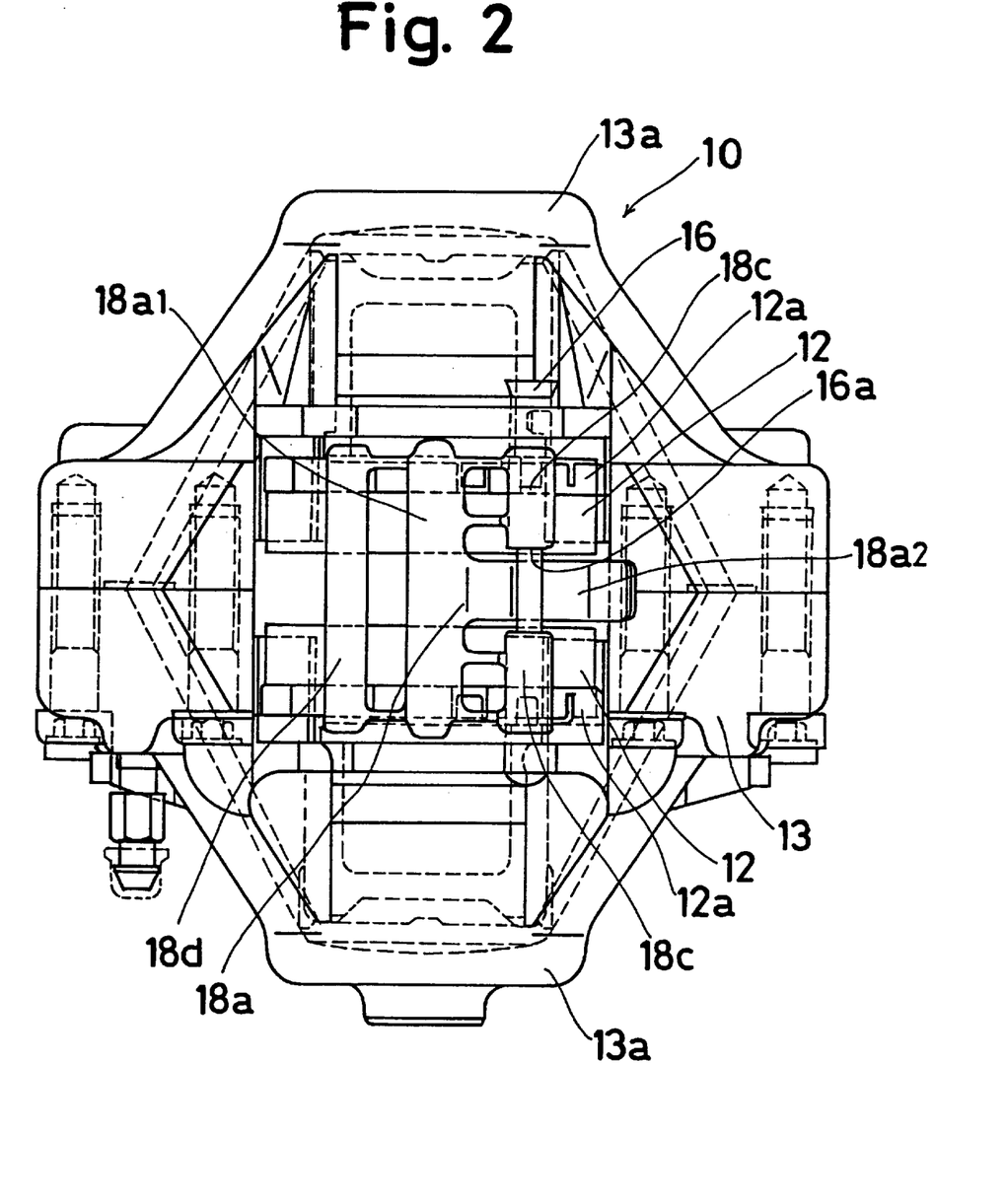
FIG. 2 is a top plan view of the disc brake according to the first embodiment of the present invention.
Figure 3:
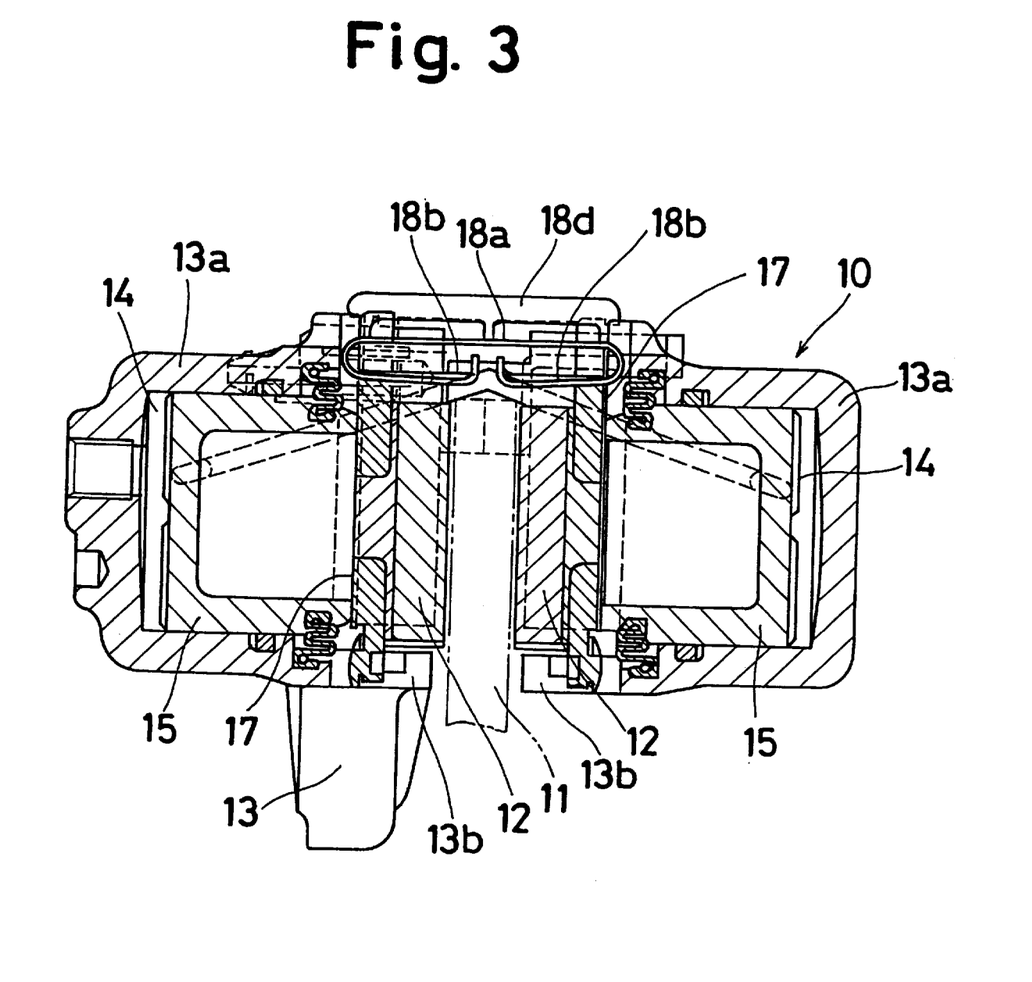
FIG. 3 is a cross-sectional view of the disc brake shown in FIG. 1 taken along the section line 3—3 of FIG. 1.

The pistons 15, 15 are slidably fitted in a pair of cylinders 13a, 13a which are integrally formed with the mounting member 13. The brake fluid chambers 14, 14 are thus defined between the pistons 15, 15 and the respective cylinders 13a, 13a. The pistons 15, 15 establish frictional engagement between the pads 12, 12 and disc rotor 11 by causing the pads 12, 12 to be pressed against the disc rotor 11 with the aid of brake fluid pressure generated in the brake fluid chambers 14, 14.

As shown in FIG. 4, each pad 12 is provided with a backing plate 12a. Each backing plate 12a is supported on the mounting member 13 by a pad supporting pin 16 and the pair of the second brake torque receiving surfaces 13b, 13b formed on the mounting member 13. The pad supporting pin 16 is arranged offset from the center of the pad 12 when viewed in the turning direction of the disc rotor 11 during forward movement of the vehicle. With reference to the FIG. 2 view, the disc rotor 11 turns counterclockwise as viewed from the side located at the bottom of the drawing figure. That is, as shown in FIG. 4, the pad supporting pin 16 is located towards the turn-in side of the disc rotor 11 with respect to the center of the pad 12. The turn-in side refers to the side of the disc rotor at which the disc rotor turns into the disc brake assembly (i.e., the right side in FIG. 4). The pad supporting pin 16, which slidably passes through a hole in the backing plate 12a, has both of its ends fitted in holes formed in the mounting member 13. By virtue of this construction, the second brake torque receiving surfaces 13b, 13b substantially prevent the pad 12 from turning about the pad supporting pin 16.

As shown in FIG. 3, a pair of shims 17 are interposed between the backing plates 12a, 12a and the pistons 15, 15 respectively. Each shim 17 is provided with a hole for slidably introducing the pad supporting pin 16 therethrough. The shims 17 help prevent the occurrence of brake noise.

Figure 5:
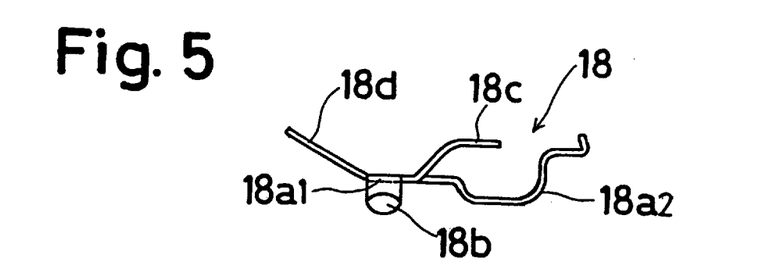
FIG. 5 is a front view of the spring member used in the disc brake.
Figure 6:
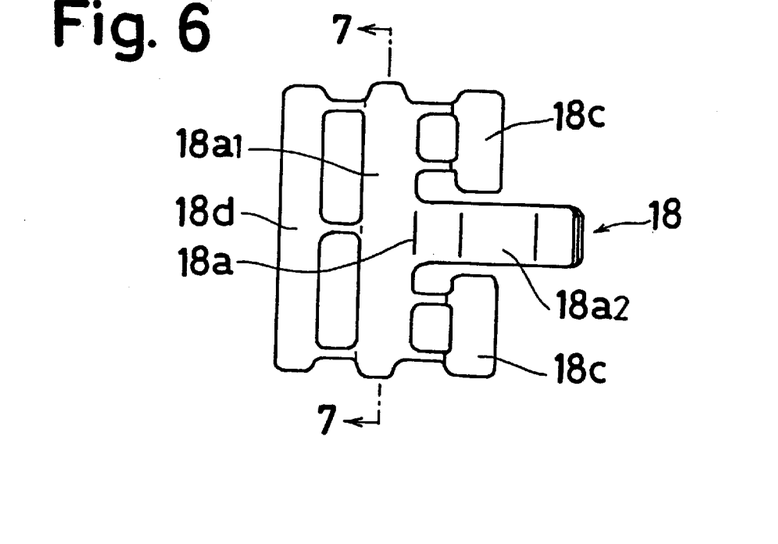
FIG. 6 is a top plan view of the spring member used in the disc brake.

As shown in FIG. 4, a leaf spring type spring member 18 is disposed substantially on the radially outward side of the disc rotor 11. FIGS. 1 through 7 depict how the spring member 18 is constructed. The spring member 18 is essentially composed of a base portion 18a, a pair of first working portions 18b, a pair of second working portions 18c, and a third working portion 18d. As shown in FIGS. 5 and 6, the base portion 18a includes a first part 18a1 extending in the axial direction of the disc rotor 11 and a second part 18a2 extending in the turning direction of the disc rotor 11.

Figure 7:
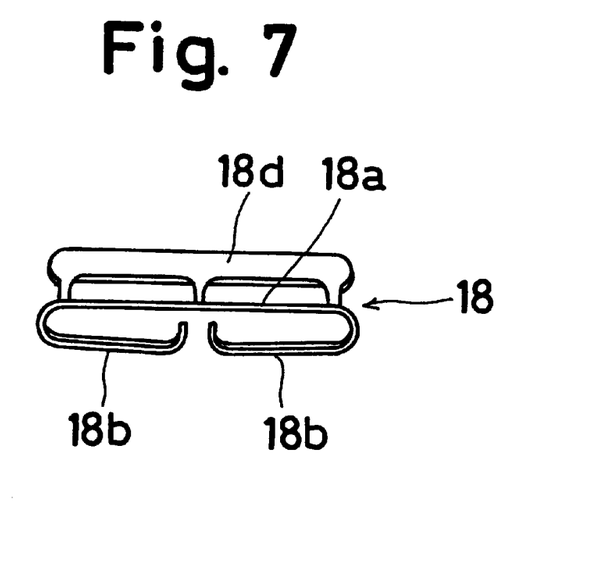
FIG. 7 is a cross-sectional view of the spring member taken along the section line 7—7 of FIG. 6.

As shown in FIG. 7, the first working portions 18b, which extend from the respective ends of the first part 18a1, are located radially inwardly of the base portion 18a (i.e., towards the disc rotor 11). As shown in FIG. 6, the second working portions 18c extend from the respective ends of the first part 18a1 and extend towards one side of the first part 18a1. The third working portion 18d extends from the opposite side of the first part 18a1.

The second part 18a2 has an intermediate curved portion that is designed to engage an annular groove 16a (see FIG. 2) formed at the center of the pad supporting pin 16 at the radially inward side of the pad supporting pin 16. As shown in FIG. 4, the edge of the second part 18a2 which is located most distant from the first part 18a1 elastically abuts the mounting member 13 on the radially outward side of the mounting member 13. Since the second part 18a2 of the spring member 18 engages the annular groove 16a, the pad supporting pin 16 is prevented from coming off the mounting member 13.

As shown in FIGS. 4 and 7, the first working portions 18b of the spring member 18 are inclined and elastically abut the bottom surface of a groove 12b that is formed at the center of each backing plate 12a. By virtue of this construction, as shown in FIG. 3, the pads 12, 12 are urged to be spaced apart from the disc rotor 11 in the axial direction by the first working portions 18b of the spring member 18.

Also, as shown in FIG. 4, each pad 12 is urged radially inwardly with respect to the disc rotor 11 by the first working portions 18b. Thus, when the brake is brought out of operation, the pads 12, 12 are positively urged to be spaced apart from the disc rotor 11, thus preventing the pads 12 from partially wearing out and alleviating brake dragging. Furthermore, when the brake is out of operation, the pads 12, 12 are prevented from being displaced in the radial direction with respect to the disc rotor 11, thus preventing the occurrence of noise.

With reference primarily to FIG. 4, the second working portions 18c of the spring member 18 each have an end portion which extends substantially perpendicular to the radial direction of the disc rotor 11. Each backing plate 12a is provided with a pair of semicircular end portions 12c, 12d formed substantially on the radially outwardly located side with respect to the disc rotor 11. The references to radially inward and radially outward are with reference to the center of the disc rotor 11. The end portion of the second working portions 18c, 18c elastically abut the semicircular portions 12c, 12c from the side located radially outwardly with respect to the disc rotor 11, thus urging the pads 12, 12 radially inwardly with respect to the disc rotor 11.

The third working portion 18d is inclined with respect to the radial direction of the disc rotor 11 and elastically abuts the semicircular portions 12d, 12d, thus urging the pads 12, 12 in a direction radially inwardly with respect to the disc rotor 11 as well as towards the turn-out side thereof. It is to be noted herein that the disc rotor 11 turns counterclockwise in FIG. 4 during the forward movement of the vehicle. The second and third working portions 18c, 18d of the spring member 18 cause the end surface of each backing plate 12a located radially inwardly with respect to the disc rotor to elastically abut the second brake torque receiving surfaces 13b, 13b.

Furthermore, each backing plate 12a has end surfaces opposed substantially in the turning direction of the rotor 11 (i.e., the substantially vertical surfaces of the backing plates 12a, 12a located on the right and left sides of the backing plates as seen with reference to FIG. 4). One of these end surfaces is provided with a projection 12f formed on the turn-out side during the forward movement of the vehicle, whereas the other end surface is provided with a projection 12f formed on the turn-in side. The third working portion 18d causes the projection 12f formed on the turn-in side of each backing plate to elastically abut on one of the pair of first brake torque receiving surfaces 13c as shown in FIG. 4.

Both of the projections 12f, 12f on each backing plate are located radially outwardly of the center of gravity G of the pad 12. On the other hand, the second brake torque receiving surfaces 13b, 13b of the mounting member 13 are located towards the radially inward side of the disc rotor 11 with respect to the center of gravity G.

As shown in FIG. 4, when the brake is in operation during the forward movement of the vehicle, a brake force F is applied at the center of gravity G of the pad 12. Therefore, on the turn-out side of the disc rotor 11 (i.e., the side of the disc rotor at which the disc rotor turns out of the disc brake assembly, the left side in FIG. 4), the projection 12f on each backing plate is brought into abutting contact with the respective first brake torque receiving surface 13c of the mounting member 13. The brake force F thus acting upon the center of gravity G generates a clockwise moment M equal to F×1 in FIG. 4. In this case, the center of the moment for each backing plate is the abutment point between the projection 12f at the turn-out side and the facing first brake torque receiving surface 13c. Due to the moment thus generated, on the turn-in side of the disc rotor 11, an edge portion of the end surface of the backing plate 12a is brought into abutting contact with the second brake torque receiving surface 13b. The reaction force applied to the backing plate 12a by the first brake torque receiving surface 13c is equal to F, whereas the reaction force F1 applied by the second brake torque receiving surface 13b is equal to F×1/Lcos θ.

When the pad 12 is displaced in the axial direction of the disc rotor 11 during the braking operation, a damping function is presented by the frictional contact established between the backing plate 12a on one hand and the second brake torque receiving surface 13b, the first brake torque receiving surface 13c, the second working portion 18c and the third working portion 18d on the other hand. Accordingly, such displacement of the pad 12 is avoided, which results in significant reduction in brake noise.

Furthermore, since the backing plates elastically abut on the first brake torque receiving surfaces 13c, the backing plates 12a do not collide with the respective first brake torque receiving surface 13c when the brake is brought into operation, thus causing no exasperating noise. Moreover, while the brake is out of operation, no noise is generated due to displacement of the pads 12, 12.

Figure 8:
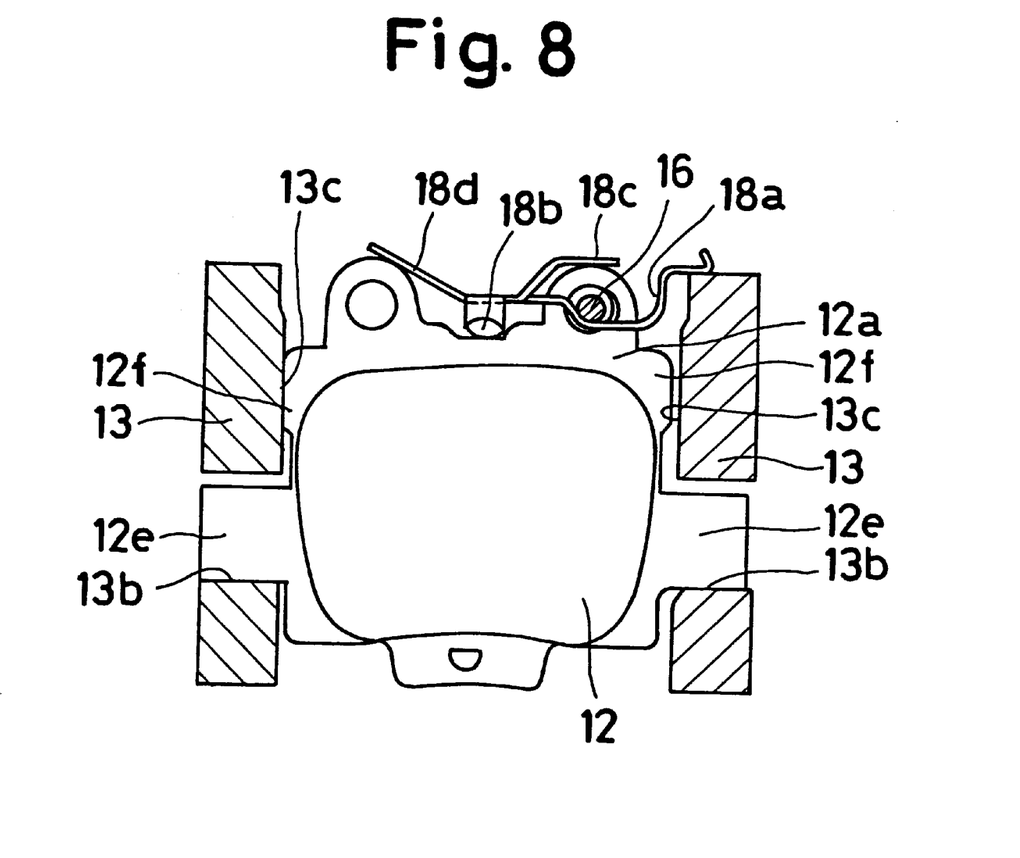
FIG. 8 is a side view similar to FIG. 4 illustrating a second embodiment of the invention.

Hereinafter, a second embodiment of the present invention will be described with reference to FIG. 8. Unlike the first embodiment in which projections on the backing plate end surfaces that are adapted to face radially inwardly with respect to the disc rotor elastically abut on the second brake torque receiving surfaces 13b, 13b, according to the second embodiment as shown in FIG. 8, the backing plate 12a is provided with a pair of projections 12e, 12e each projecting from one of the end surfaces that are opposed substantially in the turning direction of the disc rotor 11. The surfaces of the projections 12e, 12e which face radially inwardly with respect to the disc rotor are supported on the second brake torque receiving surface 13b, 13b of the mounting member 13. All of the other elements in this embodiment are denoted by the same reference numerals as in the first embodiment and therefore will not be described in any further detail.

Figure 9:
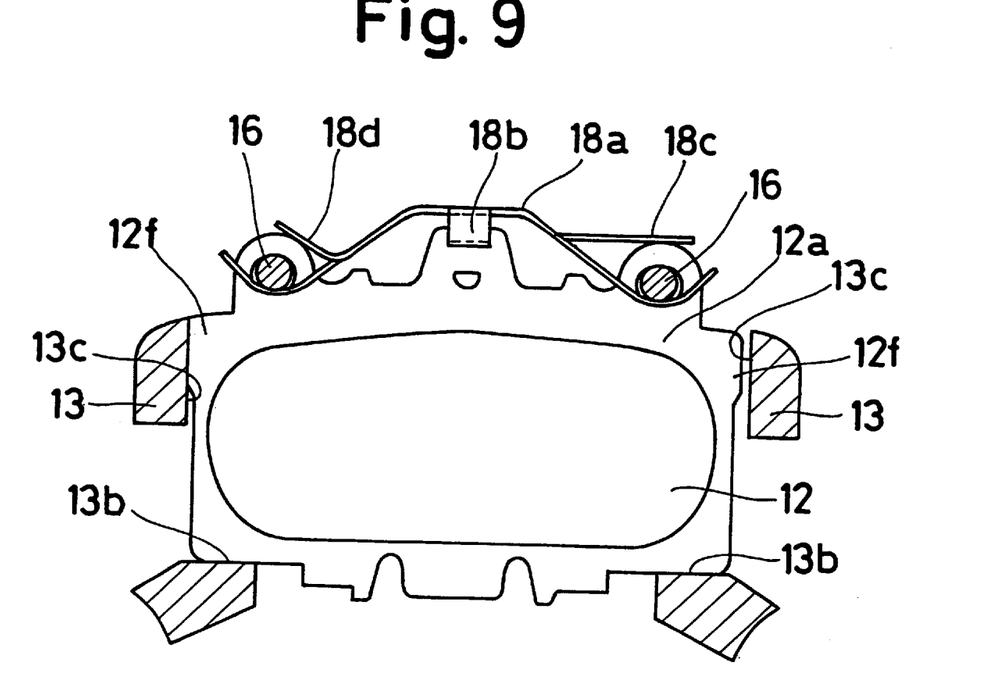
FIG. 9 is a side view similar to FIG. 4 illustrating a third embodiment of the invention.

A third embodiment of the present invention is illustrated in FIG. 9. Unlike the first embodiment in which the spring member 18 is interposed between the mounting member 13 and the backing plate 12a of the pad 12 on one hand and the pad supporting pin 16 on the other hand, according to the third embodiment shown in FIG. 9, the spring member 18 is interposed between two pad supporting pins 16, 16 on the one hand and the backing plates 12a, 12a on the other hand. Thus, the pads 12 are securely supported. In this case, the cross-shaped base portion 18a of the spring member 18 has an extending portion which extends in the turning direction of the disc rotor 11. Both of the ends of the extending portion elastically abut on the pad supporting pins 16, 16 from the radially inward side with respect to the disc rotor 11. The pad supporting pins 16, 16 are substantially equidistantly spaced on either side of a vertical plane passing through the centers of the backing plates. It is to be noted that all the other elements in this embodiment are denoted by the same reference numerals as in the first embodiment and therefore will not be described in any further detail.

Figure 10:
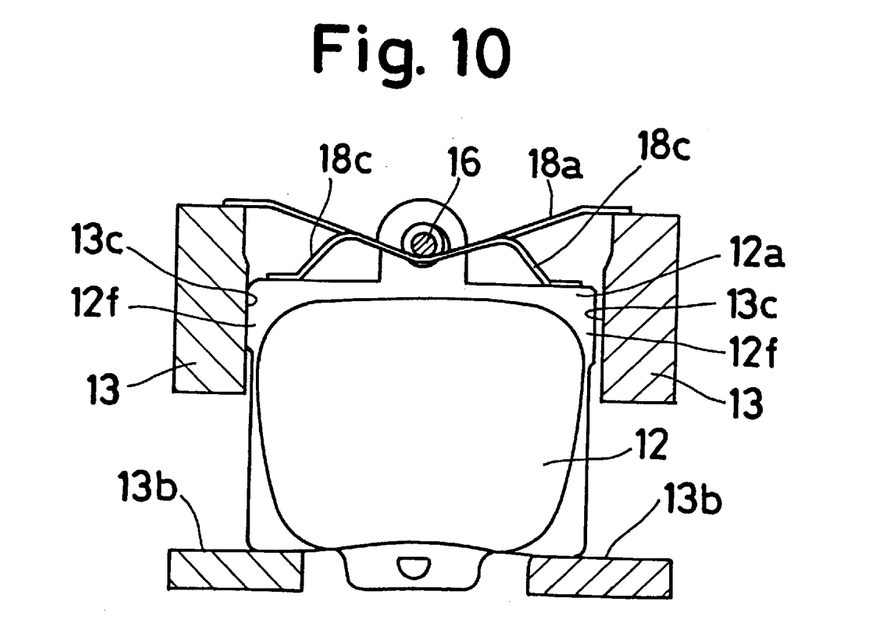
FIG. 10 is a side view similar to FIG. 4 illustrating a fourth embodiment of the invention.

A fourth embodiment of the present invention is illustrated in FIG. 10. Unlike the first embodiment in which the pad 12 is urged towards the turn-out side of the disc rotor 11 by the spring member 18, according to the fourth embodiment shown in FIG. 10, the pad 12 is urged by the spring member 18 only towards the radially inward side of the disc rotor 11. In this case, the pad supporting pin 16 is disposed substantially at the center of the pad 12 when viewed in the turning direction of the disc rotor 11. The center of the extending portion of the base portion 18a, which extends in the turning direction of the disc rotor 11, elastically abuts the pad supporting pin 16 from the radially inward side with respect to the disc rotor 11. Both of the ends of the extending portion elastically abut on the mounting member 13 from the radially outward side. In this embodiment, it is only the second working portions 18c, 18c that apply an urging force to the backing plate 12a.

As an alternative to the above-described embodiments in which the end surfaces of the backing plate that are opposed substantially in the turning direction of the disc rotor are each provided with a projection, the dimension of the backing plate viewed in the turning direction of the disc rotor may be gradually decreased in the radially outward-to-inward direction of the disc rotor.

In general, while brake noise is generated, the pads are displaced back and forth in the axial direction of the disc rotor with a relatively high frequency. In this case, the displacement stroke of the respective portions of each pad is increased in proportion to the distance from the center of gravity thereof. That is, the end surfaces of the pad opposed substantially in the radial direction with respect to the disc rotor are caused to displace to a relatively great degree, especially at the two end portions thereof which are spaced apart in the turning direction of the disc rotor.

According to the present invention, the respective end portions of the backing plate, whose displacement stroke may be relatively large, are securely pressed against the mounting member. Due to the frictional contact between the backing plate and the first and second brake torque receiving surfaces of the mounting member, such displacement of the pads is damped sufficiently.

Furthermore, according to the present invention, the pad is prevented from being displaced in the axial direction of the disc rotor due to the frictional contact between the backing plate and the working portions of the spring member as well as between the backing plate and the first and second brake torque receiving surfaces of the mounting member.

In general, the respective portions that elastically abut the brake torque receiving surfaces of the mounting member and the working portions of the spring member are likely to be displaced in the axial direction of the disc rotor to a relatively great degree. However, the present invention as described above allows such displacement of the pad to be damped sufficiently, thus substantially eliminating brake noise.

In addition, the disc brake according to the present invention is particularly advantageous in that displacement of the pad is significantly reduced due to the frictional contact between one of the end surfaces of the backing plate and the first brake torque receiving surface.

As hitherto described, the disc brake of the present invention is provided with a plurality of portions, among which frictional contact is established when the pads are displaced in the axial direction of the disc rotor. The frictionally contacting portions operate to avoid such displacement of the pads, thus achieving a significant reduction in brake noise during the braking operation.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A disc brake assembly comprising:
   a disc rotor rotatable with a vehicle wheel;
   a pair of pads each located in face to face relation with a side surface of the disc rotor, each pad having a center of gravity and being provided with a backing plate;
   a mounting member for receiving brake torque applied at the center of gravity of said pads, said mounting member being securable to a non-rotating portion of the vehicle and being provided with a pair of first brake torque receiving surfaces and a pair of second brake torque receiving surfaces;
   each backing plate having two opposing first end surfaces, said first end surfaces being adapted to abut a respective one of said first brake torque receiving surfaces at an abutment point;
   each backing plate having two spaced apart end portions each adapted to abut a respective one of said second brake torque receiving surfaces;
   said first brake torque receiving surfaces being located only towards a radially outward side of the disc rotor with respect to the center of gravity of the pads so that the brake torque generates a moment rotating the pads around each respective abutment point between the first end surfaces and the first brake torque receiving surfaces when the disc brake assembly is operated; and
   said second brake torque receiving surfaces being located towards a radially inward side of the disc rotor with respect to the center of gravity of the pads to abut a respective one of the spaced apart end portions through rotation of the pads due to said moment.

2. The disc brake assembly as set forth in claim 1, wherein the first end surfaces are provided on respective projections formed on each backing plate.

3. The disc brake assembly as set forth in claim 1, wherein said end portions are each provided on respective projections, the projections having end surfaces forming said spaced apart end portions.

4. The disc brake assembly as set forth in claim 1, further comprising:
   a spring member having working portions elastically abutting on two spaced apart end portions on each backing plate located towards the radially outward side of the disc rotor with respect to the center of gravity of the pads, said spring member urging said first end surfaces to be elastically pressed against said second brake torque receiving surfaces of said mounting member.

5. The disc brake assembly as set forth in claim 4, wherein said spring member urges one of said end portions of each backing plate to elastically abut on one of said first brake torque receiving surfaces of said mounting member.

6. The disc brake assembly as set forth in claim 1, wherein the two spaced apart end portions of each backing plate are formed on an end surface of the backing plate that is different from said first end surfaces.

7. The disc brake assembly as set forth in claim 1, including a pad supporting pin on which the backing plates are supported.

8. The disc brake assembly as set forth in claim 7, including a spring member having a portion which is positioned on a radially inward side of the pad supporting pin with respect to the center of gravity of the pads.

9. The disc brake assembly as set forth in claim 8, including a spring member having a first pair of portions that elastically engage the mounting member and second portions that elastically engage the backing plates.

10. The disc brake assembly as set forth in claim 1, including a pair of pad supporting pins on which the backing plates are supported.

11. A disc brake for being mounted with respect to a disc rotor that rotates with a vehicle wheel, comprising:
    a pair of pads positioned in opposing relation to one another for being disposed in face to face relation with a side surface of the disc rotor, each pad being provided with a backing plate;
    a mounting member for receiving brake torque applied at the center of gravity of said pads, said backing plates being supported on the mounting member, said mounting member having at least one first brake torque receiving surface and at least one second brake torque receiving surface, said first brake torque receiving surface lying in a first plane and said second brake torque receiving surface lying in a second plane, the first plane intersecting the second plane;
    each backing plate having at least one first end surface which abuts the first brake torque receiving surface only at a radially outward side of the disc rotor with respect to the center of gravity of the pads during application of torque to the pads so that the brake torque generates a moment rotating the pads around an abutment point at which the first end surface abuts the first brake torque receiving surface, and each backing plate having at least one second end surface which abuts the second brake torque receiving surface by the rotation of the pads due to said moment during application of torque to the pads.

12. The disc brake as recited in claim 11, wherein the first end surface is provided on a projection formed on each backing plate.

13. The disc brake as recited in claim 11, wherein the second end surface is provided on a projection formed on one of the backing plates.

14. The disc brake as recited in claim 11, further comprising:
   a spring member having working portions elastically abutting on two spaced apart projections provided on each backing plate to urge the first end surface to abut the first brake torque receiving surface.

15. The disc brake as recited in claim 11, including a pad supporting pin on which the backing plates are supported.

16. The disc brake as recited in claim 15, including a spring member having a portion which is positioned radially inwardly of the pad supporting pin with respect to a center of gravity of the pads.

17. The disc brake as recited in claim 11, including a spring member having a one pair of working portions that elastically engage the mounting member and other portions that elastically engage the backing plates.

18. The disc brake as recited in claim 11, wherein said first plane is oriented substantially perpendicular to the second plane.

* * * * *

UNITED STATES PATENT AND TRADEMARK OFFICE
CERTIFICATE OF CORRECTION

PATENT NO. : 5,947,234
DATED : September 7, 1999
INVENTOR(S) : SHIMAZAKI

It is certified that error appears in the above-identified patent and that said Letters Patent is hereby corrected as shown below:

On the cover page, the following is added:
-- [30] Foreign Application Priority Data
      April 8, 1996   [JP]   Japan ................ 8-85093
      Aug. 29, 1996   [JP]   Japan ................ 8-228988 --

Signed and Sealed this

Nineteenth Day of September, 2000

Attest:

Q. TODD DICKINSON

*Attesting Officer*      *Director of Patents and Trademarks*